United States Patent [19]

Prinz et al.

[11] Patent Number: 5,356,082
[45] Date of Patent: * Oct. 18, 1994

[54] INCINERATED WASTE MATERIAL TREATMENT

[75] Inventors: Peter F. Prinz, Slaughter; George O. Starke; James R. Diefenthal, both of New Orleans, all of La.

[73] Assignee: Resource Recycling, Inc., Pinellas Park, Fla.

[*] Notice: The portion of the term of this patent subsequent to Dec. 29, 2009 has been disclaimed.

[21] Appl. No.: 997,517

[22] Filed: Dec. 28, 1992

Related U.S. Application Data

[63] Continuation-in-part of Ser. No. 718,787, Jun. 21, 1991, Pat. No. 5,174,509.

[51] Int. Cl.5 .............................................. B02C 23/00
[52] U.S. Cl. ........................................ 241/24; 241/29; 241/DIG. 38
[58] Field of Search ................... 241/24, 29, DIG. 38; 110/346

[56] References Cited

U.S. PATENT DOCUMENTS

| | | | |
|---|---|---|---|
| 3,848,813 | 11/1974 | Stanczyk et al. | 241/DIG. 38 X |
| 3,905,556 | 9/1975 | Drage | 241/DIG. 38 X |
| 3,938,449 | 2/1976 | Frisz et al. | 140/346 X |
| 4,044,956 | 8/1977 | Benedetto et al. | 241/DIG. 38 X |
| 4,072,273 | 2/1978 | Reinger | 241/25 X |
| 4,098,464 | 7/1978 | Niedner et al. | 241/DIG. 38 X |
| 4,121,524 | 10/1978 | Voelskow et al. | 110/346 X |
| 4,134,731 | 1/1979 | Houser | 241/DIG. 38 X |
| 4,203,376 | 5/1980 | Hood | 110/346 |
| 4,245,999 | 1/1981 | Reinger | 241/24 X |
| 4,270,470 | 6/1981 | Barnett et al. | 110/346 |
| 5,071,075 | 12/1991 | Wiens | 241/24 X |
| 5,143,304 | 9/1992 | Schwyter | 110/346 X |
| 5,174,509 | 12/1992 | Starke et al. | 241/29 X |

Primary Examiner—Mark Rosenbaum
Assistant Examiner—Frances Han
Attorney, Agent, or Firm—William David Kiesel; Robert C. Tucker

[57] ABSTRACT

Method for treating an incinerated waste material feedstock to obtain a "free-from-ash" ferrous metal product and/or a "metal-free" ash product are disclosed which provide for early separation of the initial feedstock into a predominately ash stream and predominately ferrous metal stream by stepped separation based on size of the material at different stages of the process.

52 Claims, 1 Drawing Sheet

INCINERATED WASTE MATERIAL TREATMENT

This is a continuation-in-part of copending application Ser. No. 07/718,787 filed on Jun. 21, 1991 now U.S. Pat. No. 5,174,509.

BACKGROUND OF THE INVENTION

1. Field Of the Invention.

This invention relates in general to methods for treating incinerated waste products and the like, and more particularly, to treating incinerated municipal waste material to obtain free-from-ash ferrous metal, non-ferrous metals and/or metal-free ash as separate products.

2. Prior Art.

The increase in the volume and variety of solid waste products requiring disposal by both private and public sectors has grown dramatically. Such solid waste products have in the past been burned in mass burn or RDF incinerators. However, due to current environmental laws and regulations, incineration of solid waste has been restricted to a significant extent in many geographical areas, and in fact is prohibited in many areas today.

Disposal and burial of solid waste products in sanitary landfills is a frequently used alternative disposal method. But even this method is becoming non-acceptable in many geographical areas either because many existing landfills are reaching their capacity and additional replacement clean landfills have not been approved by regulatory agencies and authorities due to existing environmental laws and regulations and due to an actual shortage of land in some geographic areas.

Recovery of salvageable and recyclable metals, as well as "metal-free" ash, will reduce the amount of waste products that must be disposed. In addition any monies received for the recovered metals, particularly free-from-ash ferrous metals, or the metal-free ash may reduce the overall cost of treating the solid waste products. Most salvage methods involve pre-incineration separation of materials in the solid waste product, or after-incineration separation of the unburnt carboneous material from the recyclable metals and other material, or combination of these methods. Examples of the first method are disclosed in U.S. Pat. Nos. 3,524,594; 3,790,091 and 3,817,458, and examples of the other methods are disclosed in U.S. Pat. Nos. 4,113,185; 4,662,570; 4,815,667 and 5,067,659.

The treatment of incinerated waste products, particularly municipal waste products, presents numerous treatment problems. One significant problem is the diversity of the feedstock. It may include unburnt tree stumps, washing machines, metal bars, thin strands of wire, rocks, etc., all in various shapes and sizes, as well as significant quantities of ash. This diversity requires that the equipment be designed to handle this variety of materials.

Another significant problem is the abrasive characteristic of much of the incinerated waste material. This abrasiveness can wear out certain pieces of equipment in just hours or days. The resulting shut down time and equipment replacement cost can make a particular method uneconomical.

Still another problem is the moisture content of the incinerated waste material which makes the material tacky, particularly the wet ash. This tackiness can cause clogging or blinding problems with the equipment.

A further problem is plugging or jamming of equipment which can occur because of wire and similar material in the incinerated waste material.

All of these problems are particularly acute in the various screening devices typically used in such processes.

There are also in many cases the requirement that the process be designed so that the equipment can be positioned in restricted spaces, yet capable of handling enormous throughput of incinerated waste material.

Still another problem with existing processes when recovering free-from-ash ferrous metal from incinerated waste feedstock is the lack of consistent quality of the recovered ferrous metal. In most cases the ash content of the recovered ferrous metal is too high for the ferrous metal to be used in steel production and similar processes. Thus it must be sold at a much lower price as a low grade ferrous metal.

Another significant problem results from the combination of the large quantity of incinerated waste material that must be treated and the high percentage of ash material contained in the incinerated waste material. Prior treating processes do not efficiently separate the material being treated to reduce the time and wear on the processing equipment.

A still further problem has been the inability to process large quantities of feedstock in a manner that results in most of the ash being sufficiently metal-free to allow the ash to be used in building materials such as concrete. As a result, there is a greater processing cost per ton because a significant quantity of ash material must be disposed, rather than recycled in another product.

OBJECTS AND SUMMARY OF THE INVENTION

Therefore one object of this invention is to provide methods of processing incinerated waste material of diverse characteristics.

Another object of this invention is to provide methods of processing incinerated waste material that can withstand the abrasive character of the material, particularly the ash particles contained in the incinerated waste material.

Still another object of this invention is to provide methods of processing incinerated waste material in large quantities and in restricted space.

A still further object of this invention is to provide methods of processing incinerated waste material which will substantially reduce down time resulting from the tackiness of the material or its tendency to clog, blind or jam the equipment.

A further object of this invention is to provide methods of processing incinerated waste material which allows recovery of "free-from-ash" ferrous metal.

Another object of this invention is to provide methods of processing incinerated waste material which results in efficiently separate the material being treated to reduce the time and wear on the processing equipment.

Other objects and advantages of the invention will become apparent from the ensuing descriptions of the invention.

A further object of this invention is to provide methods of processing incinerated waste material which results in a substantial portion of the ash in the feedstock being separated as metal-free ash.

Accordingly, a method for treating a feedstock of incinerated waste material containing ferrous metals, non-ferrous metals and ash to produce a metal-free ash product is disclosed comprising the steps of: separating the feedstock to form a first stream whose components each have dimensions which are less than a first pre-determined size, and a second stream whose components each have dimensions which are greater than said first pre-determined size; conveying the first stream to a sizing means to form a third stream whose components each have dimensions which are greater than a second pre-determined size, and a fourth stream whose components each have dimensions which are less than the second pre-determined size; the second pre-determined size being less than the first pre-determined size; removing ferrous metal from the fourth stream to form a first ferrous metal stream, and a fifth stream; separating the fifth stream to form an eighth stream whose components each have dimensions which are less than a fourth pre-determined size and are comprised substantially of metal-free ash, and a ninth stream whose components each have dimensions which are greater than the fourth pre-determined size; the fourth pre-determined size being less than the second pre-determined size; and recovering the eighth stream.

PREFERRED EMBODIMENTS OF THE INVENTION

Figure 1:
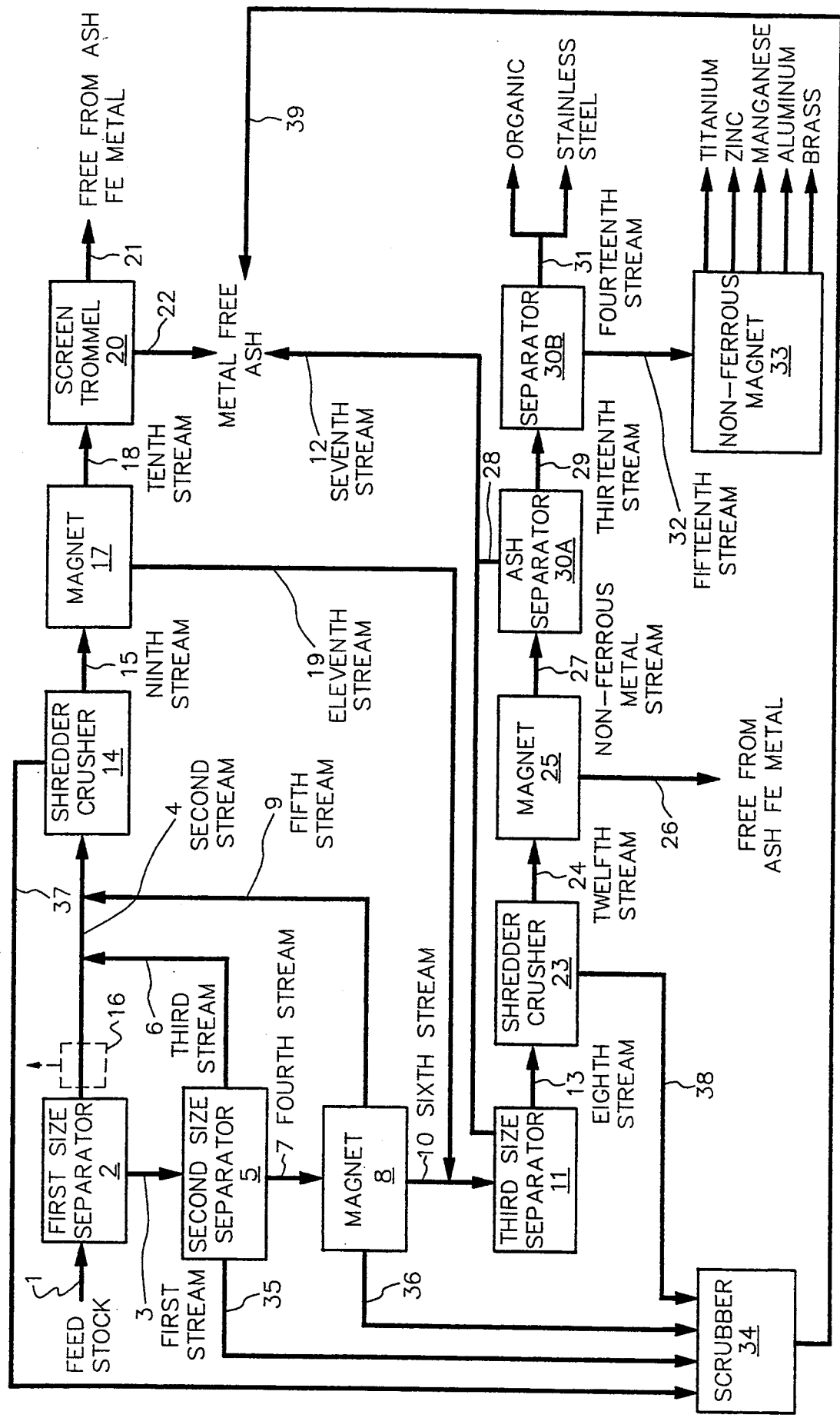
FIG. 1 is a schematic flow diagram of a preferred embodiment of the method for treating incinerated waste material in accordance with a preferred embodiment of this invention.

The preferred embodiments of the invention shall be described utilizing incinerated municipal waste as the feedstock. However, it is to be understood that the methods of this invention are equally useful for other waste product feedstocks such as might be encountered in various industrial processes.

In a typical municipal waste-to-energy plant the waste products will be brought to a central collection plant and stored for a short period of time before it is incinerated. There is generally little or no pre-sortment of the waste material prior to incineration. However, in some cases recyclable paper, small tin containers and plastic and glass bottles may be removed prior to incineration. There is seldom any attempt to remove the moisture content from the waste material other than what might drain out during the short storage period before incineration.

Thus, typical municipal waste to be incinerated will include a variety of wood products, other organic products, ferrous and non-ferrous metal products of all shapes and sizes. In a modern incineration plant these products are carried to a large furnace where they are burned at 1400°–2000° F. to produce electricity which is then sold to defray some of the cost of incineration. Enormous quantity of ash, as well as ferrous and non-ferrous metal and some organic products are the by-products of this incineration. The amount of moisture content in these incineration by-products can vary. The moisture content may be up to 40% by the time they are presented for further processing. It is the treatment of these incinerated by-products that the preferred embodiments of this invention are directed. More particularly the preferred embodiments of this invention describe a process wherein the incinerated waste material is separated to produce a free-from-ash ferrous material, a clean non-ferrous material, and/or a clean, metal-free ash material which is less than ⅜ inch in any dimension. Because such ash material can be economically used in the manufacturing of concrete blocks, all of the incinerated waste material processed can be recycled and not be required to be used as landfill.

"Free-from-ash" ferrous material means ferrous metal which has the inherent ash content reduced to less than 1.0% of total content by weight.

"Metal-free" ash means ash which has the inherent metal content reduced to less than 0.05% of total content by weight.

Referring now to FIG. 1, the incinerated waste material feedstock 1 is transferred to a first size separator 2 which is constructed to separate the feedstock into two streams based on a first pre-determined size of the material in the feedstock.

It has been found that a substantial portion of the ferrous metal-containing components of the feedstock can be quickly separated from a substantial portion of the ash components of the feedstock by this initial size separation. In addition by proper sizing the feedstock is split into two streams of desired quantity to allow efficient flow though the process for the particular equipment being utilized. Further by proper sizing it is possible to minimize the amount of ash that flows through most of the process equipment in order to minimize the wear on the equipment from the abrasive characteristic of the ash. Although the size can vary depending upon the makeup of the feedstock, for incinerated municipal waste feedstock it is preferred that the first pre-determined size be 4–8 inches, more preferably about six inches. Thus, in a preferred embodiment of this invention first size separator 2 forms a first stream 3 containing material having dimensions less than four inches, and more preferably less than six inches which is by weight predominately ash and non-ferrous metals, and forms a second stream 4 containing material having dimensions greater than four inches, more preferably about six inches which is by weight predominately ferrous metal material.

Separator 2 can be any means capable of separating the feedstock into at least two streams based on size. There are many type of separating apparatus available to separate the initial feedstock; however, when the plant site is of limited area, it is preferred that the separating assembly comprise a support structure having a top deck to receive the feedstock capable of being vibrated, most preferably by a double mount, high frequency motor vibrator. Separating apparatus such as that shown in now abandoned U.S. patent application Ser. No. 07/720,220, entitled "Apparatus for separating Incinerated Waste Products" and filed on Jun. 21, 1991 by Peter F. Prinz, one of the inventors herein, are particularly preferred. Other separating devices would include any vibrating screens or conveyors of a heavy duty nature.

First stream 3 is transferred by conveyor, or such other similar conventional means, to a second size separator 5 whereby first stream 3 will be divided in accordance with a second pre-determined size less than the first pre-determined size. For incinerated municipal waste it is preferred that this second pre-determined size be 1–3 inches, preferably about two inches. It is further preferred that the separation be made in a manner to remove a substantial portion of any ash which may be adhered to the ferrous or non-ferrous metals in stream 3.

It is particularly preferred that this separation be made by the use of a trommel, or a vibrating bar system contained in a cascade type of separator design, that both removes the ash from the metals as well as separates stream 3 into two streams: third stream 6 and a fourth stream 7. Third stream 6 will consist essentially of components of dimensions greater than about one inch and more preferably greater than about two inches which will be predominantly metal components. Fourth steam 7 will consist essentially of components of dimension less than about three inches, and more preferably less than about two inches, which will be predominantly ash and some metal components.

In a preferred embodiment third stream 6 comprising predominantly metal material is conveyed or otherwise transported to second stream 4, also comprising predominantly metal material, for further processing as described below.

Ferrous metal is then removed from fourth stream 7 by passing the stream through magnet means 8, such as a tramp magnet or magnet head pulley. Other methods of removing the ferrous metal include magnetic belts, magnetic drums or other moving magnetic systems. This results in the formation of a fifth stream 9 which is by weight predominantly ferrous metal, but which may contain some ash which is still adhered to the ferrous metal, and a sixth stream 10 which consists by weight primarily of ash and non-ferrous metals. In a preferred embodiment the ferrous metal stream 9 is conveyed or otherwise transported to the predominantly metal second stream 4 for further processing as described below. In more preferred embodiment both third stream 6 and fifth stream 9 are combined with second stream 4.

Sixth stream 10 is transported by conveyor, or other conventional means, to third size separator 11. Separator 11 should be capable of separating sixth stream 10 by a third predetermined size. By proper selection of the third pre-determined size a seventh stream 12 will be formed consisting of substantially only metal-free ash (preferably at least 90% metal-free ash). Also formed will be eighth stream 13 consisting of metals and larger sized ash particles. In a preferred embodiment the third pre-determined size is 0.25 to 0.75 inches, and most preferably about 0.375 inches. The determination of the third pre-determined size was made upon discovering that in incinerated municipal waste material 90% of the available non-ferrous metal is greater than about ⅜ inches in dimensions. By making stream separations wherein material less than about ⅜ inches in dimensions are removed, quicker recovery of the end products can be achieved. For example, in an existing plant processing 150 tons/hour of municipal incinerated waste products it takes approximately 80 machine hours to process the feedstock. However, if the ⅜ inch size is changed only slightly to about 5/16 the machine hours doubles and only 5% additional recovery of non-ferrous metals is achieved and the amount of metal-free ash increases only by 0.01%. Thus substantial improvements in process efficiency can be achieved with proper sizing separation in the various stages of the process.

This separation can be achieved by various screening devices commercially available, but it is preferred to utilize separator devices such as disclosed in co-pending U.S. patent application Ser. No. 07/719,268, entitled "Screens for Use in Treating Incinerated Waste Material", and filed on Jun. 21, 1991 by Peter J. Prinz, one of the inventors herein, or in co-pending U.S. patent application Ser. No. 07/719,265, entitled "Cascading Screens for Use in Treating Incinerated Waste Material", and filed on Jun. 21, 1991 by Peter J. Prinz, one of the inventors herein.

In a preferred embodiment second stream 4, along with third stream 6 and fifth stream 9 are conveyed, or otherwise transported to a means 14, such as a shredder or large crusher, to reduce all components of the three streams to a fourth pre-determined size. A preferred fourth pre-determined size is 3–5 inches, more preferably about four inches. It has been found that this size will result in the ability to recover a "free-from-ash" ferrous material having a density greater than 70 pounds/cubic foot. Such a product is very desirable for use in the production of steel, and has not been obtainable with other known prior art processes for treating municipal incinerated waste product. Thus, ninth stream 15 is formed with substantially no metal components greater than four inches in any dimension and a density greater than 70 pounds/ cubic foot.

In the event there are components in the second stream 4 which are too large to pass through shredder/crusher 14, a means 16, such as a by-pass opening in the conveyor transporting second stream 4 to shredder/crusher 14, can be provided which will allow the removal of such large items. Such items could include very large pieces of pipe, structural steel or large heavy metal solids.

Ninth stream 15 is then treated, such as passing it through a magnetic drum separator 17, to form tenth stream 18 consisting of ferrous metal which may still have some ash adhered to the ferrous metal pieces, and to form eleventh stream 19 consisting principally of non-ferrous metal and ash.

In a preferred embodiment the non-ferrous metal and ash in eleventh stream 19 is conveyed and combined with sixth stream 10 to be further processed as described herein.

To remove ash which might still be adhered to the ferrous metal in tenth stream 18, tenth stream 18 is conveyed, or otherwise transported, to a cascading vibrating screen or second trommel 20 which is operated in a manner to remove a sufficient amount of ash to allow recovery of a "free-from-ash" ferrous metal in recovery stream 21, and to allow recovery of the thus formed metal-free ash in recovery stream 22. In a preferred embodiment cascading vibrating screen or trommel 20 will be operated in a manner to achieve a 70 pound/cubic foot plus density "free-from-ash" ferrous metal. In this preferred embodiment the ash which is separated in this step and recovered in recovery stream 22 is metal-free ash.

Eighth stream 13 is conveyed, or otherwise transported, to means 23, such as a crusher or a shredder, which reduces all components in the eighth stream 13 to components whose dimensions are less than a fifth pre-determined size. The fifth pre-determined size is 2–3 inches, preferably about 2.5 inches. This twelfth stream 24 is treated, such as passing through parallel tramp magnets 25, to remove any remaining ferrous metal. The ferrous metal is collected in stream 26. The non-ferrous metal stream 27 undergoes a final dual sizing separation that first separates ash from stream 27 in separator 30A to form a metal-free ash stream 28 containing ash having dimensions less than about 0.375 inches, and to form thirteenth stream 29 comprising primarily organic material and non-ferrous metals. Then by separator means 30B, stream 29 is separated into a fourteenth stream comprising non-ferrous metals (primarily stainless steel) and other organic components having dimensions between 0.375 and 1.0 inches, and into a fourteenth stream 31 comprising non-ferrous metals having dimensions between 1 and 3 inches. This final dual sizing separation can be achieved by various commercially available separating devices such as the ones described above, as well as by other conventional shaker screens or vibrating screens. In a preferred embodiment metal-free ash in stream 28 will be combined with seventh stream 12, and recovered for use in the manufacture of concrete blocks or other products.

If desired the stainless steel can be separated from the other organic material in fourteenth stream 31. This can be done by hand or by such other known methods. Also if desired the non-ferrous metals in fifteenth stream 32 can be separated from one another by the use of parallel eddy-current, non-ferrous magnet 33 or other similarly known devices. Typical metals that can be separated include titanium, zinc, manganese, aluminum and brass.

It is not uncommon that dust-sized ash particles are formed during the formation of the fifth stream 9, third stream 6, fourth stream 7, during the shredding or crushing of second stream 4, or during the shredding or crushing of the eighth stream 13. To prevent the escape of these dust-sized ash particles into the environment and to allow for their recovery a conventional scrubber assembly is utilized to entrap the particles during their formation and agglomerate them for collection. Such conventional scrubber assemblies typically include a collection system for capturing the dust-sized particles and transporting them to a scrubber agglomeration unit 34. The collection system generally includes a vacuum assembly that sucks up the dust particles and transports them through ducts (shown by line 35 between second size separator 5 and scrubber agglomeration unit 34, line 36 between magnet 8 and scrubber agglomeration unit 34, line 37 between shredder/crusher 14 and scrubber agglomeration unit 34, and line 38 between shredder/crusher 23 and scrubber agglomeration unit 34) to the agglomeration unit 34 where they are collected. Once the ash has been agglomerated it is transferred to a desired collection point. Since the collected ash is metal-free ash, it can be combined with seventh stream 12 or transported directly, as illustrated by line 39, to another desired collection point.

There are of course other alternate embodiments which are obvious from the foregoing descriptions of the invention which are intended to be included within the scope of the invention as defined by the following claims.

What I claim is:

1. A method for treating a feedstock of incinerated waste material containing ferrous metals, non-ferrous metals and ash to produce a metal-free ash product comprising the steps of:
   (a) in a first means capable of separating the feedstock according to size, separating the feedstock to form:
      (i) a first stream whose components each have dimensions which are less than a first pre-determined size, and
      (ii) a second stream whose components each have dimensions which are greater than said first pre-determined size;
   (b) transporting the first stream to a second means capable of separating the first stream according to size;
   (c) separating in the second means the first stream to form:
      (i) a third stream whose components each have dimensions which are greater than a second pre-determined size, and
      (ii) a fourth stream whose components each have dimensions which are less than the second pre-determined size, and
      wherein the second pre-determined size is less than the first pre-determined size;
   (d) magnetically treating the fourth stream to remove ferrous metal to form:
      (i) a fifth stream whose largest component by weight is the ferrous metal removed from the fourth stream, and
      (ii) a sixth stream whose largest components by weight are ash and non-ferrous metal;
   (e) transporting the sixth stream to a third means capable of separating the sixth stream according to size;
   (f) separating in the third means the sixth stream to form:
      (i) a seventh stream whose components each have dimensions which are less than a third pre-determined size and are comprised substantially of metal-free ash, and
      (ii) an eighth stream whose components each have dimensions which are greater than the third pre-determined size, and
      wherein the third pre-determined size is less than the second pre-determined size;
   (g) recovering the seventh stream;
   (h) transporting ash dust particles created in the second means during the step of separating the first stream to form the third stream and the fourth stream to a scrubber means capable of agglomeration of the ash dust particles;
   (i) agglomerating the ash dust particles to form a stream of agglomerated ash dust particles; and
   (j) recovering the agglomerated ash dust particles.

2. A method for treating a feedstock of incinerated waste material containing ferrous metals, non-ferrous metals and ash to produce a metal-free ash product comprising the steps of:
   (a) in a first means capable of separating the feedstock according to size, separating the feedstock to form:
      (i) a first stream whose components each have dimensions which are less than a first pre-determined size, and
      (ii) a second stream whose components each have dimensions which are greater than said first pre-determined size;
   (b) transporting the first stream to a second means capable of separating the first stream according to size;
   (c) separating in the second means the first stream to form:
      (i) a third stream whose components each have dimensions which are greater than a second pre-determined size, and
      (ii) a fourth stream whose components each have dimensions which are less than the second pre-determined size, and
      wherein the second pre-determined size is less than the first pre-determined size;
   (d) magnetically treating the fourth stream to remove ferrous metal to form:
      (i) a fifth stream whose largest component by weight is the ferrous metal removed from the fourth stream, and (ii) a sixth stream whose largest components by weight are ash and non-ferrous metal;

(e) transporting the sixth stream to a third means capable of separating the sixth stream according to size;

(f) separating in the third means the sixth stream to form:
  (i) a seventh stream whose components each have dimensions which are less than a third pre-determined size and are comprised substantially of metal-free ash, and
  (ii) an eighth stream whose components each have dimensions which are greater than the third pre-determined size, and
  wherein the third pre-determined size is less than the second pre-determined size;

(g) recovering the seventh stream;

(h) transporting ash dust particles created in the step of magnetically treating the fourth stream to form the fifth stream and the sixth stream to a scrubber means capable of agglomeration of the ash dust particles;

(i) agglomerating the ash dust particles to form a stream of agglomerated ash dust particles; and (j) recovering the agglomerated ash dust particles.

3. A method for treating a feedstock of incinerated waste material containing ferrous metals, non-ferrous metals and ash to produce a metal-free ash product comprising the steps of:

(a) in a first means capable of separating the feedstock according to size, separating the feedstock to form:
  (i) a first stream whose components each have dimensions which are less than a first pre-determined size, and
  (ii) a second stream whose components each have dimensions which are greater than said first pre-determined size;

(b) transporting the first stream to a second means capable of separating the first stream according to size;

(c) separating in the second means the first stream to form:
  (i) a third stream whose components each have dimensions which are greater than a second pre-determined size, and
  (ii) a fourth stream whose components each have dimensions which are less than the second pre-determined size, and
  wherein the second pre-determined size is less than the first pre-determined size;

(d) magnetically treating the fourth stream to remove ferrous metal to form:
  (i) a fifth stream whose largest component by weight is the ferrous metal removed from the fourth stream, and
  (ii) a sixth stream whose largest components by weight are ash and non-ferrous metal;

(e) transporting the sixth stream to a third means capable of separating the sixth stream according to size;

(f) separating in the third means the sixth stream to form:
  (i) a seventh stream whose components each have dimensions which are less than a third pre-determined size and are comprised substantially of metal-free ash, and
  (ii) an eighth stream whose components each have dimensions which are greater than the third pre-determined size, and
  wherein the third pre-determined size is less than the second pre-determined size;

(g) recovering the seventh stream;

(h) transporting ash dust particles created:
  (i) in the step of separating the first stream to form the third stream and the fourth stream to a scrubber means capable of agglomeration of the ash dust particles, and
  (ii) in the step of magnetically treating the fourth stream to form the fifth stream and the sixth stream to the scrubber means;

(i) agglomerating the ash dust particles to form a stream of agglomerated ash dust particles; and (j) recovering the agglomerated ash dust particles.

4. A method for treating a feedstock of incinerated waste material containing ferrous metals, non-ferrous metals and ash to produce a metal-free ash product comprising the steps of:

(a) in a first means capable of separating the feedstock according to size, separating the feedstock to form:
  (i) a first stream whose components each have dimensions which are less than a first pre-determined size, and
  (ii) a second stream whose components each have dimensions which are greater than said first pre-determined size;

(b) transporting the first stream to a second means capable of separating the first stream according to size;

(c) separating in the second means the first stream to form:
  (i) a third stream whose components each have dimensions which are greater than a second pre-determined size, and
  (ii) a fourth stream whose components each have dimensions which are less than the second pre-determined size, and
  wherein the second pre-determined size is less than the first pre-determined size;

(d) magnetically treating the fourth stream to remove ferrous metal to form:
  (i) a fifth stream whose largest component by weight is the ferrous metal removed from the fourth stream, and
  (ii) a sixth stream whose largest components by weight are ash and non-ferrous metal;

(e) transporting the sixth stream to a third means capable of separating the sixth stream according to size;

(f) separating in the third means the sixth stream to form:
  (i) a seventh stream whose components each have dimensions which are less than a third pre-determined size and are comprised substantially of metal-free ash, and
  (ii) an eighth stream whose components each have dimensions which are greater than the third pre-determined size, and
  wherein the third pre-determined size is less than the second pre-determined size;

(g) recovering the seventh stream;

(h) transporting the eighth stream to a reducing means capable of reducing the dimensions of material in the eighth stream;

(i) reducing in the reducing means the dimensions of the material in the eighth stream to a size less than a fourth pre-determined size, wherein the fourth pre-determined size is less than the third pre-determined size; and (j) transporting ash dust particles created in the step of reducing in the reducing means the dimensions of the material in the eighth stream to a scrubber means capable of agglomeration of the ash dust particles;

(k) agglomerating the ash dust particles to form a stream of agglomerated ash dust particles; and (l) recovering the stream of agglomerated ash dust particles.

5. A method for treating a feedstock of incinerated waste material containing ferrous metals, non-ferrous metals and ash to produce a metal-free ash product comprising the steps of:

(a) in a first means capable of separating the feedstock according to size, separating the feedstock to form:
  (i) a first stream whose components each have dimensions which are less than a first pre-determined size, and
  (ii) a second stream whose components each have dimensions which are greater than said first pre-determined size;

(b) transporting the first stream to a second means capable of separating the first stream according to size;

(c) separating in the second means the first stream to form:
  (i) a third stream whose components each have dimensions which are greater than a second pre-determined size, and
  (ii) a fourth stream whose components each have dimensions which are less than the second pre-determined size, and
  wherein the second pre-determined size is less than the first pre-determined size;

(d) magnetically treating the fourth stream to remove ferrous metal to form:
  (i) a fifth stream whose largest component by weight is the ferrous metal removed from the fourth stream, and
  (ii) a sixth stream whose largest components by weight are ash and non-ferrous metal;

(e) transporting the sixth stream to a third means capable of separating the sixth stream according to size;

(f) separating in the third means the sixth stream to form:
  (i) a seventh stream whose components each have dimensions which are less than a third pre-determined size and are comprised substantially of metal-free ash, and
  (ii) an eighth stream whose components each have dimensions which are greater than the third pre-determined size, and
  wherein the third pre-determined size is less than the second pre-determined size;

(g) recovering the seventh stream;

(h) transporting the eighth stream to a reducing means capable of reducing the dimensions of material in the eighth stream;

(i) reducing in the reducing means the dimensions of the material in the eighth stream to a size less than a fourth pre-determined size, wherein the fourth pre-determined size is less than the third pre-determined size; and (j) transporting ash dust particles created:
  (i) in the step of reducing in the reducing means the dimensions of the material in the eighth stream to a scrubber means capable of agglomeration of the ash dust particles, and
  (ii) in the step of magnetically treating the fourth stream to form the fifth stream and the sixth stream to the scrubber means;

(k) agglomerating the ash dust particles to form a stream of agglomerated ash dust particles; and (l) recovering the stream of agglomerated ash dust particles.

6. A method for treating a feedstock of incinerated waste material containing ferrous metals, non-ferrous metals and ash to produce a metal-free ash product comprising the steps of:

(a) in a first means capable of separating the feedstock according to size, separating the feedstock to form:
  (i) a first stream whose components each have dimensions which are less than a first pre-determined size, and
  (ii) a second stream whose components each have dimensions which are greater than said first pre-determined size;

(b) transporting the first stream to a second means capable of separating the first stream according to size;

(c) separating in the second means the first stream to form:
  (i) a third stream whose components each have dimensions which are greater than a second pre-determined size, and
  (ii) a fourth stream whose components each have dimensions which are less than the second pre-determined size, and
  wherein the second pre-determined size is less than the first pre-determined size;

(d) magnetically treating the fourth stream to remove ferrous metal to form:
  (i) a fifth stream whose largest component by weight is the ferrous metal removed from the fourth stream, and
  (ii) a sixth stream whose largest components by weight are ash and non-ferrous metal;

(e) transporting the sixth stream to a third means capable of separating the sixth stream according to size;

(f) separating in the third means the sixth stream to form:
  (i) a seventh stream whose components each have dimensions which are less than a third pre-determined size and are comprised substantially of metal-free ash, and
  (ii) an eighth stream whose components each have dimensions which are greater than the third pre-determined size, and
  wherein the third pre-determined size is less than the second pre-determined size;

(g) recovering the seventh stream;

(h) transporting the eighth stream to a reducing means capable of reducing the dimensions of material in the eighth stream;

(i) reducing in the reducing means the dimensions of the material in the eighth stream to a size less than a fourth pre-determined size, wherein the fourth pre-determined size is less than the third pre-determined size; and (j) transporting ash dust particles created:
  (i) in the step of reducing in the reducing means the dimensions of the material in the eighth stream to a scrubber means capable of agglomeration of the ash dust particles,
  (ii) in the step of separating the first stream to form the third stream and the fourth stream to the scrubber means, and
  (iii) in the step of agnetically treating the fourth stream to form the fifth stream and the sixth stream to the scrubber means;

(k) agglomerting the ash dust particles to form a stream of agglomerted ash dust particles; and (l) recovering the stream of agglomerated ash dust particles.

7. A method for treating a feedstock of incinerated waste material containing ferrous metals, non-ferrous metals and ash to produce a metal-free ash product comprising the steps of:

(a) in a first means capable of separating the feedstock according to size, separating the feedstock to form:
  (i) a first stream whose components each have dimensions which are less than a first pre-determined size, and
  (ii) a second stream whose components each have dimensions which are greater than said first pre-determined size;

(b) transporting the first stream to a second means capable of separating the first stream according to size;

(c) separating in the second means the first stream to form:
  (i) a third stream whose components each have dimensions which are greater than a second pre-determined size, and
  (ii) a fourth stream whose components each have dimensions which are less than the second pre-determined size, and
  wherein the second pre-determined size is less than the first pre-determined size;

(d) magnetically treating the fourth stream to remove ferrous metal to form:
  (i) a fifth stream whose largest component by weight is the ferrous metal removed from the fourth stream, and
  (ii) a sixth stream whose largest components by weight are ash and non-ferrous metal;

(e) transporting the sixth stream to a third means capable of separating the sixth stream according to size;

(f) separating in the third means the sixth stream to form:
  (i) a seventh stream whose components each have dimensions which are less than a third pre-determined size and are comprised substantially of metal-free ash, and
  (ii) an eight stream whose components each have dimensions which are greater than the third pre-determined size, and
  wherein the third pre-determined size is less than the second pre-determined size;

(g) combining the second stream with the third stream; and (h) recovering the seventh stream.

8. A method for treating a feedstock of incinerated waste material containing ferrous metals, non-ferrous metals and ash to produce a metal-free ash product comprising the steps of:

(a) in a first means capable of separating the feedstock according to size, separating the feedstock to form:
  (i) a first stream whose components each have dimensions which are less than a first pre-determined size, and
  (ii) a second stream whose components each have dimensions which are greater than said first pre-determined size;

(b) transporting the first stream to a second means capable of separating the first stream according to size;

(c) separating in the second means the first stream to form:
  (i) a third stream whose components each have dimensions which are greater than a second pre-determined size, and
  (ii) a fourth stream whose components each have dimensions which are less than the second pre-determined size, and
  wherein the second pre-determined size is less than the first pre-determined size;

(d) magnetically treating the fourth stream to remove ferrous metal to form:
  (i) a fifth stream whose largest component by weight is the ferrous metal removed from the fourth stream, and
  (ii) a sixth stream whose largest components by weight are ash and non-ferrous metal;

(e) transporting the sixth stream to a third means capable of separating the sixth stream according to size;

(f) separating in the third means the sixth stream to form:
  (i) a seventh stream whose components each have dimensions which are less than a third pre-determined size and are comprised substantially of metal-free ash, and
  (ii) an eighth stream whose components each have dimensions which are greater than the third pre-determined size, and
  wherein the third pre-determined size is less than the second pre-determined size;

(g) combining the fifth stream with the second stream; and (h) recovering the seventh stream.

9. A method for treating a feedstock of incinerated waste material containing ferrous metals, non-ferrous metals and ash to produce a metal-free ash product comprising the steps of:

(a) in a first means capable of separating the feedstock according to size, separating the feedstock to form:
  (i) a first stream whose components each have dimensions which are less than a first pre-determined size, and
  (ii) a second stream whose components each have dimensions which are greater than said first pre-determined size;

(b) transporting the first stream to a second means capable of separating the first stream according to size;

(c) separating in the second means the first stream to form:
  (i) a third stream whose components each have dimensions which are greater than a second pre-determined size, and (ii) a fourth stream whose components each have dimensions which are less than the second pre-determined size, and
wherein the second pre-determined size is less than the first pre-determined size;
(d) magnetically treating the fourth stream to remove ferrous metal to form:
(i) a fifth stream whose largest component by weight is the ferrous metal removed from the fourth stream, and
(ii) a sixth stream whose largest components by weight are ash and non-ferrous metal;
(e) transporting the sixth stream to a third means capable of separating the sixth stream according to size;
(f) separating in the third means the sixth stream to form:
(i) a seventh stream whose components each have dimensions which are less than a third pre-determined size and are comprised substantially of metal-free ash, and
(ii) an eighth stream whose components each have dimensions which are greater than the third pre-determined size, and
wherein the third pre-determined size is less than the second pre-determined size;
(g) combining the third, fifth and second streams; and
(h) recovering the seventh stream.

10. A method for treating a feedstock of incinerated waste material containing ferrous metals, non-ferrous metals and ash to produce a metal-free ash product comprising the steps of:
(a) in a first means capable of separating the feedstock according to size, separating the feedstock to form:
(i) a first stream whose components each have dimensions which are less than a first pre-determined size, and
(ii) a second stream whose components each have dimensions which are greater than said first pre-determined size;
(b) transporting the first stream to a second means capable of separating the first stream according to size;
(c) separating in the second means the first stream to form:
(i) a third stream whose components each have dimensions which are greater than a second pre-determined size, and
(ii) a fourth stream whose components each have dimensions which are less than the second pre-determined size, and
wherein the second pre-determined size is less than the first pre-determined size;
(d) magnetically treating the fourth stream to remove ferrous metal to form:
(i) a fifth stream whose largest component by weight is the ferrous metal removed from the fourth stream, and
(ii) a sixth stream whose largest components by weight are ash and non-ferrous metal;
(e) transporting the sixth stream to a third means capable of separating the sixth stream according to size;
(f) separating in the third means the sixth stream to form:
(i) a seventh stream whose components each have dimensions which are less than a third pre-determined size and are comprised substantially of metal-free ash, and
(ii) an eighth stream whose components each have dimensions which are greater than the third pre-determined size, and
wherein the third pre-determined size is less than the second pre-determined size;
(g) recovering the seventh stream;
(h) transporting the eighth stream to a first reducing means capable of reducing the dimensions of material in the eighth stream;
(i) reducing in the first reducing means the dimensions of the material in the eighth stream to form a ninth stream whose particles have a size less than a fourth pre-determined size, wherein the fourth pre-determined size is less than the third pre-determined size;
(j) magnetically treating the ninth stream to form:
(i) a free-from-ash ferrous metal stream, and
(ii) a non-ferrous metal stream comprising ash, organic material and non-ferrous metals;
(k) recovering the free-from-ash ferrous metal stream.

11. A method according to claim 10 which further comprises:
(a) transporting the non-ferrous metal stream to a first ash separator means capable of separating ash having dimensions less than a fifth pre-determined size from the non-ferrous metal stream;
(b) separating in the first ash separator means the ash to form:
(i) a metal-free ash stream comprising metal-free ash having dimensions less than the fifth pre-determined size, and
(ii) a tenth stream comprising the organic material and the non-ferrous metals having dimensions greater than the fifth pre-determined size; and
(c) combining the metal-free ash stream with the seventh stream.

12. A method according to claim 11 which further comprises:
(a) transporting the tenth stream to a fourth means capable of separating the tenth stream according to a sixth pre-determined size;
(b) separating the tenth stream to form:
(i) an eleventh stream comprising the organic material and non-ferrous metals having dimensions less than the sixth pre-determined size, and
(ii) a twelfth stream comprising the non-ferrous metals having dimensions less than the sixth pre-determined size;
(c) separating the organic material from the non-ferrous metals in the eleventh stream; and
(d) recovering the non-ferrous metals in the eleventh stream.

13. A method according to claim 12 wherein the seventh pre-determined size is 1 to 3 inches.

14. A method according to claim 11 which further comprises:
(a) transporting the tenth stream to a.fourth means capable of separating the tenth stream according to a sixth pre-determined size;
(b) separating the tenth stream to form:
(i) an eleventh stream comprising the organic material and non-ferrous metals having dimensions less than the sixth pre-determined size, and (ii) a twelfth stream comprising the non-ferrous metals having dimensions less than the sixth pre-determined size; and (c) magnetically treating the non-ferrous metals in the twelfth stream to separate the non-ferrous metals into groups containing common metals.

15. A method according to claim 11 wherein the sixth pre-determined size is about ⅜ inches.

16. A method for treating a feedstock of incinerated waste material containing ferrous metals, non-ferrous metals and ash to produce a metal-free ash product comprising the steps of:
   (a) in a first means capable of separating the feedstock according to size, separating the feedstock to form:
      (i) a first stream whose components each have dimensions which are less than a first pre-determined size, and
      (ii) a second stream whose components each have dimensions which are greater than said first pre-determined size;
   (b) transporting the first stream to a second means capable of separating the first stream according to size;
   (c) separating in the second means the first stream to form:
      (i) a third stream whose components each have dimensions which are greater than a second pre-determined size, and
      (ii) a fourth stream whose components each have dimensions which are less than the second pre-determined size, and
      wherein the second pre-determined size is less than the first pre-determined size;
   (d) magnetically treating the fourth stream to remove ferrous metal to form:
      (i) a fifth stream whose largest component by weight is the ferrous metal removed from the fourth stream, and
      (ii) a sixth stream whose largest components by weight are ash and non-ferrous metal;
   (e) transporting the sixth stream to a third means capable of separating the sixth stream according to size;
   (f) separating in the third means the sixth stream to form:
      (i) a seventh stream whose components each have dimensions which are less than a third pre-determined size and are comprised substantially of metal-free ash, and
      (ii) an eighth stream whose components each have dimensions which are greater than the third pre-determined size, and
      wherein the third pre-determined size is less than the second pre-determined size; and
   (g) recovering the seventh stream;
   (h) transporting the second stream to a first reducing means capable of reducing the dimensions of material in the second stream;
   (i) reducing in the first reducing means the dimensions of the material in the second stream to a size less than a fourth pre-determined size to form a ninth stream, wherein the fourth pre-determined size is less than the first pre-determined size;
   (j) magnetically treating the ninth stream to form:
      (i) a tenth stream whose largest component by weight is the ferrous metal removed from the ninth stream, and
      (ii) an eleventh stream whose largest components by weight are ash, non-ferrous metal and organic material;
   (k) transporting the tenth stream to a first ash separator means for separating ash from ferrous metal;
   (l) separating in the first ash separator means ash from the ferrous metal in the tenth stream to form:
      (i) a metal-free ash stream, and
      (ii) a first free-from-ash ferrous metal stream; and
   (m) recovering the metal-free ash stream.

17. A method according to claim 16 wherein the first pre-determined size is 4 to 8 inches, the second pre-determined size is 1 to 3 inches, the third pre-determined size is ¼ to ¾ inches, and the fourth pre-determined size is 3 to 5 inches.

18. A method according to claim 16 wherein the fifth stream is combined with the second stream prior to transporting the second stream to the first reducing means.

19. A method according to claim 16 wherein the third stream and the fifth stream are combined with the second stream prior to transporting the second stream to the first reducing means.

20. A method according to claim 16 which further comprises:
   (a) transporting ash dust created in the first reducing means during the step of reducing the dimensions of the material to a scrubber means capable of agglomeration of the ash dust particles;
   (b) agglomerating the ash dust particles to form a stream of agglomerated ash dust particles; and
   (c) recovering the stream of agglomerated ash dust particles.

21. A method according to claim 16 which further comprises:
   (a) transporting ash dust particles created:
      (i) in the step of reducing in the first reducing means the dimensions of the material in the second stream,
      (ii) in the step of separating the first stream to form the third stream and the fourth stream to a scrubber means capable of agglomeration of the ash dust particles, and
      (iii) in the step of magnetically treating the fourth stream to form the fifth stream and the sixth stream to the scrubber means;
   (b) agglomerating the ash dust particles to form a stream of agglomerated ash dust particles; and
   (c) recovering the stream of agglomerated ash dust particles.

22. A method according to claim 16 which further comprises:
   (a) transporting the eighth stream to a second reducing means capable of reducing the dimensions of material in the eighth stream;
   (b) reducing in the second reducing means the dimensions of the material in the eighth stream to a size less than a fifth pre-determined size, wherein the fifth pre-determined size is less than the fourth pre-determined size; and
   (c) transporting ash dust particles created:
      (i) in the step of reducing in the second reducing means the dimensions of the material in the eighth stream to a scrubber means capable of agglomeration of the ash dust particles,
      (ii) in the step of reducing in the first reducing means the dimensions of the material in the second stream to the scrubber means, (iii) in the step of separating the first stream to form the third stream and the fourth stream to the scrubber means, and
(iv) in the step of magnetically treating the fourth stream to form the fifth stream and the sixth stream to the scrubber means;
(d) agglomerating the ash dust particles to form a stream of agglomerated ash dust particles; and
(e) recovering the stream of agglomerated ash dust particles.

23. A method according to claim 16 which further comprises recovering the first free-from-ash ferrous metal stream.

24. A method according to claim 16 wherein material having a dimension greater than can be reduced in the first reducing means is removed from the second stream prior to being introduced into the first reducing means.

25. A method according to claim 16 wherein:
(a) material having a dimension greater than what can be reduced in the first reducing means is removed from the second stream prior to being introduced into the first reducing means, and
(b) recovering the first free-from-ash ferrous metal stream.

26. A method according to claim 16 which further comprises:
(a) transporting ash dust particles created:
(i) in the step of separating the first stream to form the third stream and the fourth stream to a scrubber means capable of agglomeration of the ash dust particles, and
(ii) in the step of magnetically treating the fourth stream to form the fifth stream and the sixth stream to the scrubber means;
(b) agglomerating the ash dust particles to form a stream of agglomerated ash dust particles;
(c) recovering the stream of agglomerated ash dust particles; and
(d) combining the eleventh stream with the sixth stream prior to separating the sixth stream in the third means.

27. A method according to claim 16 which further comprises:
(a) transporting ash dust particles created:
(i) in the step of separating the first stream to form the third stream and the fourth stream to a scrubber means capable of agglomeration of the ash dust particles, and
(ii) in the step of magnetically treating the fourth stream to form the fifth stream and the sixth stream to the scrubber means;
(b) agglomerating the ash dust particles to form a stream of agglomerated ash dust particles;
(c) recovering the stream of agglomerated ash dust particles;
(d) combining the eleventh stream with the sixth stream prior to separating the sixth stream in the third means; and
(e) recovering the first free-from-ash ferrous metal stream.

28. A method according to claim 16 wherein the second pre-determined size is 1 to 3 inches.

29. A method according to claim 16 wherein the third pre-determined size is ¼ to ¾ inches.

30. A method according to claim 16 wherein the first pre-determined size is 4 to 8 inches, the second pre-determined size is 1 to 3 inches, and the third pre-determined size is ¼ to ¾ inches.

31. A method according to claim 16 wherein the third stream is combined with the second stream prior to transporting the second stream to the first reducing means.

32. A method according to claim 31 which further comprises recovering the free-from-ash ferrous metal stream.

33. A method according to claim 16 which further comprises:
(a) combining the eleventh stream with the sixth stream prior to separating the sixth stream in the third means;
(b) transporting the eighth stream to a second reducing means capable of reducing the dimensions of material in the eighth stream;
(c) reducing in the second reducing means the dimensions of the material in the eighth stream to a size less than a fifth pre-determined size, wherein the fifth pre-determined size is less than the fourth pre-determined size; and
(d) transporting ash dust particles created:
(i) in the step of reducing in the second reducing means the dimensions of the material in the eighth stream to a scrubber means capable of agglomeration of the ash dust particles,
(ii) in the step of separating the first stream to form the third stream and the fourth stream to the scrubber means, and
(iii) in the step of magnetically treating the fourth stream to form the fifth stream and the sixth stream to the scrubber means;
(e) agglomerating the ash dust particles to form a stream of agglomerated ash dust particles; and
(f) recovering the stream of agglomerated ash dust particles.

34. A method according to claim 33 which further comprises recovering the first free-from-ash ferrous metal stream.

35. A method according to claim 16 which further comprises:
(a) combining the eleventh stream with the sixth stream prior to separation in the third means;
(b) transporting the eighth stream to a second reducing means capable of reducing the dimensions of material in the eighth stream;
(c) reducing in the second reducing means the dimensions of the material in the eighth stream to form a twelfth stream whose particles have a size less than a fifth pre-determined size, wherein the fifth pre-determined size is less than the fourth pre-determined size;
(d) magnetically treating the twelfth stream to form:
(i) a second free-from-ash ferrous metal stream, and
(ii) a non-ferrous metal stream comprising ash, organic material and non-ferrous metals;
(e) recovering the second free-from-ash ferrous metal stream.

36. A method according to claim 35 wherein the third stream and the fifth stream are combined with the second stream prior to transporting the second stream to the first reducing means.

37. A method according to claim 16 which further comprises:
(a) combining the eleventh stream with the sixth stream prior to separation in the third means;
(b) transporting the eighth stream to a second reducing means capable of reducing the dimensions of material in the eighth stream;

(c) reducing in the second reducing means the dimensions of the material in the eighth stream to form a twelfth stream whose particles have a size less than a fifth pre-determined size, wherein the fifth pre-determined size is less than the fourth pre-determined size;

(d) magnetically treating the twelfth stream to form:
(i) a second free-from-ash ferrous metal stream, and
(ii) a non-ferrous metal stream comprising ash, organic material and non-ferrous metals;

(e) recovering the second free-from-ash ferrous metal stream;

(f) transporting the non-ferrous metal stream to a second ash separator means capable of separating ash having dimensions less than a sixth pre-determined size from the non-ferrous metal stream;

(g) separating in the second ash separator means the ash to form:
(i) a second metal-free ash stream comprising metal-free ash having dimensions less than the sixth pre-determined size, and
(ii) a thirteenth stream comprising the organic material and the non-ferrous metals having dimensions greater than the sixth pre-determined size; and (h) combining the second metal-free ash stream with the seventh stream;

(i) transporting the thirteenth stream to an fourth means capable of separating the thirteenth stream according to a seventh pre-determined size;

(j) separating the thirteenth stream to form:
(i) a fourteenth stream comprising the organic material and non-ferrous metals having dimensions less than the seventh pre-determined size, and
(ii) a fifteenth stream comprising the non-ferrous metals having dimensions less than the seventh pre-determined size;

(k) separating the organic material from the non-ferrous metals in the fourteenth stream; and (l) recovering the non-ferrous metals in the fourteenth stream.

38. A method according to claim 37 which further comprises magnetically treating the non-ferrous metals in the fifteenth stream to separate the non-ferrous metals into groups containing common metals.

39. A method according to claim 16 wherein the first pre-determined size is 4 to 8 inches.

40. A method according to claim 39 wherein the first pre-determined size is about 6 inches.

41. A method according to claim 16 wherein the fourth pre-determined size is 3 to 5 inches.

42. A method according to claim 41 wherein the fourth pre-determined size is about 4 inches.

43. A method according to claim 16 which further comprises combining the eleventh stream with the sixth stream prior to separating the sixth stream in the third means.

44. A method according to claim 43 wherein material having a dimension greater than can be reduced in the first reducing means is removed from the second stream prior to being introduced into the first reducing means.

45. A method according to claim 44 which further comprises recovering the first free-from-ash ferrous metal stream.

46. A method according to claim 16, which further comprises:

(a) transporting the eighth stream to a second reducing means capable of reducing the dimensions of material in the eighth stream;

(b) reducing in the second reducing means the dimensions of the material in the eighth stream to form a twelfth stream whose particles have a size less than a fifth pre-determined size, wherein the fifth pre-determined size is less than the fourth pre-determined size;

(c) magnetically treating the twelfth stream to form:
(i) a second free-from-ash ferrous metal stream, and
(ii) a non-ferrous metal stream comprising ash, organic material and non-ferrous metals; and (d) recovering the first and second free-from-ash ferrous metal streams.

47. A method according to claim 46 which further comprises:

(a) transporting the non-ferrous metal stream to a second ash separator means capable of separating ash having dimensions less than a sixth pre-determined size from the non-ferrous metal stream;

(b) separating in the second ash separator means the ash to form:
(i) a second metal-free ash stream comprising metal-free ash having dimensions less than the sixth pre-determined size, and
(ii) a thirteenth stream comprising the organic material and the non-ferrous metals having dimensions greater than the sixth pre-determined size; and (c) combining the second metal-free ash stream with the seventh stream.

48. A method according to claim 47 which further comprises:

(a) transporting the thirteenth stream to an fourth means capable of separating the thirteenth stream according to a seventh pre-determined size;

(b) separating the thirteenth stream to form:
(i) a fourteenth stream comprising the organic material and non-ferrous metals having dimensions less than the seventh pre-determined size, and
(ii) a fifteenth stream comprising the non-ferrous metals having dimensions less than the seventh pre-determined size;

(c) separating the organic material from the non-ferrous metals in the fourteenth stream; and (d) recovering the non-ferrous metals in the fourteenth stream.

49. A method according to claim 48 wherein the seventh pre-determined size is 1 to 3 inches.

50. A method according to claim 47 which further comprises:

(a) transporting the thirteenth stream to an fourth means capable of separating the thirteenth stream according to a seventh pre-determined size;

(b) separating the thirteenth stream to form:
(i) a fourteenth stream comprising the organic material and non-ferrous metals having dimensions less than the seventh pre-determined size, and
(ii) a fifteenth stream comprising the non-ferrous metals having dimensions less than the seventh pre-determined size; and (c) magnetically treating the non-ferrous metals in the fifteenth stream to separate the non-ferrous metals into groups containing common metals.

51. A method according to claim 47 wherein the sixth pre-determined size is about $\frac{3}{8}$ inches.

52. A method according to claim 6, 11 or 47 wherein the fifth pre-determined size is 2 to 3 inches.

* * * * *

UNITED STATES PATENT AND TRADEMARK OFFICE
CERTIFICATE OF CORRECTION

PATENT NO. : 5,356,082
DATED : October 18, 1994
INVENTOR(S) : Prinz, et al

It is certified that error appears in the above-identified patent and that said Letters Patent is hereby corrected as shown below:

TITLE PAGE:

Assignee: (73), "Pinellas Park, Fla." should read -- New Orleans, Louisiana --

Column 2, line 59, "separate" should read -- separating --

Column 3, line 59, "quantity" should read -- quanties --

Column 4, line 45, "type" should read -- types --

Column 5, line 9, "steam" should read -- stream --

Column 5, line 55, "doubles" should read -- double --

Column 6, line 1, "and" should be deleted

Signed and Sealed this

Ninth Day of May, 1995

Attest:

BRUCE LEHMAN

Attesting Officer — Commissioner of Patents and Trademarks

UNITED STATES PATENT AND TRADEMARK OFFICE
CERTIFICATE OF CORRECTION

PATENT NO. : 5,356,082
DATED : October 18, 1994
INVENTOR(S) : Prinz, et al

It is certified that error appears in the above-identified patent and that said Letters Patent is hereby corrected as shown below:

TITLE PAGE:
Assignee: (73), "Pinellas Park, Fla." should read -- New Orleans, Louisiana --

Column 2, line 59, "separate" should read -- separating --

Column 3, line 59, "quantity" should read --quantities--

Column 4, line 45, "type" should read -- types --

Column 5, line 9, "steam" should read -- stream --

Column 5, line 55, "doubles" should read -- double --

Column 6, line 1, "and" should be deleted

This certificate supersedes Certificate of Correction issued May 9, 1995.

Signed and Sealed this

Twenty-ninth Day of August, 1995

Attest:

BRUCE LEHMAN

*Attesting Officer*   *Commissioner of Patents and Trademarks*